US012077006B2

(12) United States Patent
Takahashi et al.

(10) Patent No.: US 12,077,006 B2
(45) Date of Patent: Sep. 3, 2024

(54) CARRIAGE APPARATUS AND PRINTING APPARATUS

(71) Applicant: CANON KABUSHIKI KAISHA, Tokyo (JP)

(72) Inventors: Ryutaro Takahashi, Tokyo (JP); Daigo Kuronuma, Kanagawa (JP); Naoaki Wada, Kanagawa (JP); Tomohito Abe, Kanagawa (JP); Kenta Iimura, Kanagawa (JP); Ryohei Maruyama, Kanagawa (JP); Masakazu Nagashima, Kanagawa (JP); Toshiaki Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/489,282

(22) Filed: Sep. 29, 2021

(65) Prior Publication Data

US 2022/0097429 A1 Mar. 31, 2022

(30) Foreign Application Priority Data

Sep. 30, 2020 (JP) ................................ 2020-166110

(51) Int. Cl.
*B41J 25/00* (2006.01)
*B41J 19/20* (2006.01)

(52) U.S. Cl.
CPC ............ *B41J 25/006* (2013.01); *B41J 19/202* (2013.01)

(58) Field of Classification Search
CPC ........ B41J 19/202; B41J 19/005; B41J 2/145; B41J 2/15; B41J 25/001; B41J 29/38;
(Continued)

(56) References Cited

U.S. PATENT DOCUMENTS 3,236,351 A * 2/1966 Fitch .......................... B41J 2/27
400/279
3,244,955 A * 4/1966 Turner .................. G06K 13/28
318/7
(Continued)

FOREIGN PATENT DOCUMENTS

CN 1498771 A 5/2004
CN 105317947 A 2/2016
(Continued)

OTHER PUBLICATIONS

Machine Translation of Notice of Refusal (NPL #1—IDS Dec. 22, 2023) (Year: 2023).*
(Continued)

*Primary Examiner* — John Zimmermann
(74) *Attorney, Agent, or Firm* — Venable LLP

(57) ABSTRACT

The carriage apparatus includes a carriage configured to reciprocally move in a first direction, a first motor arranged on a side of one end of a range of movement of the carriage and configured to drive the carriage, a second motor arranged on a side of the other end of the range of movement of the carriage and configured to drive the carriage, a carriage belt suspended between the first motor and the second motor, attached with the carriage, and configured to move the carriage in the first direction, and a support portion configured to mount the second motor so that the second motor is displaceable in the first direction with respect to the first motor.

18 Claims, 11 Drawing Sheets

(58) Field of Classification Search
CPC ..... B41J 19/20; B41J 2/01; B41J 23/02; B41J 23/00; B41J 25/00; F16H 19/0672; F16H 2019/0686; B65G 23/44; H02P 5/46
See application file for complete search history.

(56) References Cited

U.S. PATENT DOCUMENTS

| | | | | | |
|---|---|---|---|---|---|
| 4,203,679 | A * | 5/1980 | Duerr | B41J 19/202 400/322 |
| 4,288,168 | A * | 9/1981 | Mayr | B41J 19/202 400/322 |
| 4,494,025 | A * | 1/1985 | Fickler | F16H 25/2018 74/25 |
| 4,653,948 | A | 3/1987 | Ikeda | |
| 6,921,147 | B2 | 7/2005 | Mitarai et al. | |
| 7,247,109 | B2 | 7/2007 | Youn | |
| 8,016,396 | B2 | 9/2011 | Kobayashi et al. | |
| 9,568,072 | B2 | 2/2017 | Ito et al. | |
| 9,621,082 | B2 * | 4/2017 | Tanami | B41J 19/207 |
| 2003/0206212 | A1 | 11/2003 | Mitarai et al. | |
| 2012/0306960 | A1 * | 12/2012 | Niihara | B41J 2/1752 347/20 |
| 2016/0193843 | A1 * | 7/2016 | Hagstrom | B41J 2/16508 347/86 |
| 2020/0001639 | A1 * | 1/2020 | Fernandez Vazquez | B41J 2/145 |
| 2020/0094593 | A1 * | 3/2020 | Hiruma | B41J 25/006 |
| 2022/0363081 | A1 * | 11/2022 | Abe | B41J 19/207 |

FOREIGN PATENT DOCUMENTS

| | | | |
|---|---|---|---|
| JP | 60-109952 | U | 7/1985 |
| JP | 62-297167 | A | 12/1987 |
| JP | 7-125369 | A | 5/1995 |
| JP | 3604994 | B2 | 12/2004 |
| JP | 2005-186591 | A | 7/2005 |
| JP | 2011-176901 | A | 9/2011 |
| JP | 2013-129107 | A | 7/2013 |
| JP | 2014-151534 | A | 8/2014 |
| JP | 2014-168885 | A | 9/2014 |
| KR | 10-2006-0113498 | A | 11/2006 |
| WO | 2019/221741 | A1 | 11/2019 |

OTHER PUBLICATIONS

Machine Translation of NPLD #1 of IDS (Jul. 24, 2024)—Korean Office Action; STIC Translation. (Year: 2024).*

Extended European Search Report dated Feb. 9, 2022, in European Patent Application No. 21199351.4.

Office Action dated Feb. 23, 2023, in Chinese Patent Application No. 202111151047.4.

U.S. Appl. No. 17/488,971, filed Sep. 29, 2021, Tomohito Abe, Ryutaro Takahashi, Naoaki Wada, Daigo Kuronuma, Kenta Iimura, Ryohei Maruyama, Masakazu Nagashima, Toshiaki Yamaguchi, Takahiro Daikoku.

Office Action dated Nov. 6, 2023, in Japanese Patent Application No. 2020-166110.

Office Action dated Jul. 17, 2024, in Korean Patent Application No. 2021-0128534.

* cited by examiner

CARRIAGE APPARATUS AND PRINTING APPARATUS

BACKGROUND OF THE INVENTION

Field of the Invention

The present invention relates to a carriage apparatus and a printing apparatus and particularly relates to, for example, a printing apparatus that includes an arrangement for applying tension to a carriage belt for providing a driving force to reciprocally scan a carriage incorporating an inkjet printhead.

Description of the Related Art

In recent years, there is increasing demand for improving the productivity and the image quality of an inkjet printing apparatus that prints on a print medium by discharging ink from a printhead while reciprocally scanning a carriage incorporating the printhead and conveying the print medium by a conveyance mechanism. More specifically, there is an increasing tendency for a printhead to have a longer printing width and a higher printing resolution, and the weight of the printhead has increased accordingly. Hence, a carriage which incorporates such a printhead needs to be driven at a high speed and high accuracy regardless of such a weight increase.

Therefore, there is an arrangement (twin motor arrangement) that includes a driving motor on each of both ends of a range of movement of a carriage to raise the driving force of the carriage in a case in which the carriage has a heavy weight or in a case in which the scanning speed of the carriage needs to be increased (Japanese Patent No. 3604994).

In such an arrangement, it is desirable to apply, in a simple manner as possible, appropriate tension to a carriage belt suspended between the two motors. Furthermore, the tension applied to the carriage to make the carriage scan at a greater driving force needs to be reliably maintained so the tension will not be changed by the driving force.

However, the above-described related art does not disclose anything about the adjustment between the two driving motors.

SUMMARY OF THE INVENTION

The present invention provides a technique that can apply desired tension to a carriage belt and maintain the tension without requiring complicated adjustment.

According to an aspect of the present invention, there is provided a carriage apparatus comprising: a carriage configured to reciprocally move in a first direction; a first motor arranged on a side of one end of a range of movement of the carriage and configured to drive the carriage; a second motor arranged on a side of the other end of the range of movement of the carriage and configured to drive the carriage; a carriage belt suspended between the first motor and the second motor, attached with the carriage, and configured to move the carriage in the first direction; and a support portion configured to mount the second motor so that the second motor is displaceable in the first direction with respect to the first motor.

Further features of the present invention will become apparent from the following description of exemplary embodiments (with reference to the attached drawings).

DESCRIPTION OF THE EMBODIMENTS

Figure 1A:
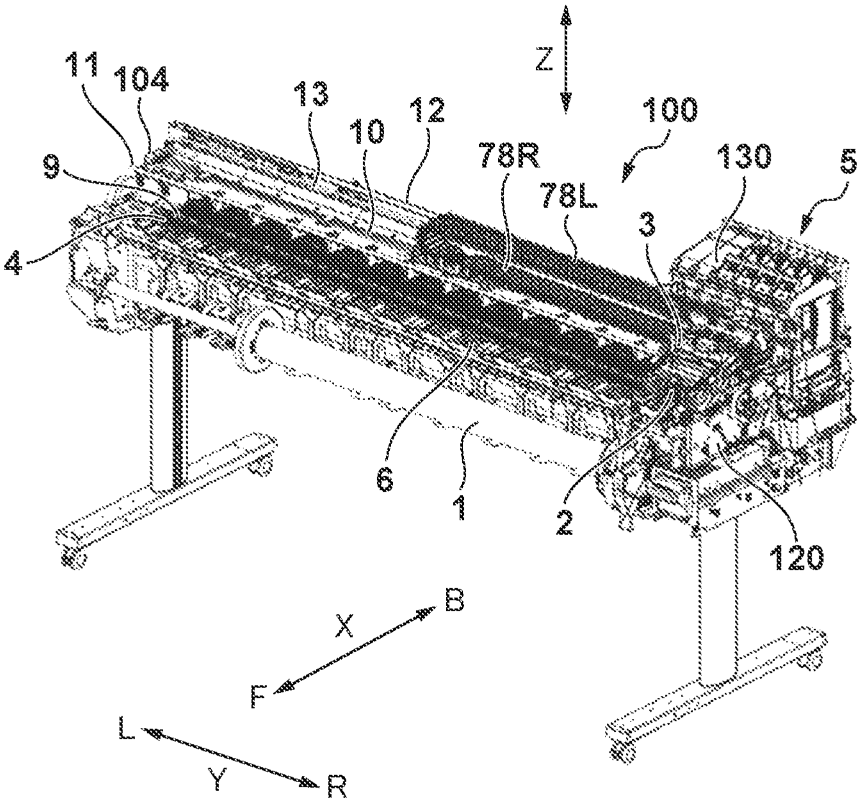
FIGS. 1A and 1B are external perspective views showing a schematic arrangement of an inkjet printing apparatus according to a representative embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in this specification, the term "printing" (to be also referred to as "print" hereinafter) not only includes the formation of significant information such as characters and graphics, regardless of whether they are significant or insignificant. Furthermore, it broadly includes the formation of images, figures, patterns, and the like on a print medium, or the processing of the medium, regardless of whether they are so visualized as to be visually perceivable by humans.

In addition, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to also be referred to as a "liquid" hereinafter) should be extensively interpreted similar to the definition of "printing (print)" described above. That is, "ink" includes a liquid which, when applied onto a print medium, can form images, figures, patterns, and the like, can process the print medium, or can process ink (for example, solidify or insolubilize a coloring material contained in ink applied to the print medium).

Further, a "nozzle" generically means an orifice or a liquid channel communicating with it, and an element for generating energy used to discharge ink, unless otherwise specified.

A substrate for a printhead (head substrate) used below means not merely a base made of a silicon semiconductor, but a configuration in which elements, wirings, and the like are arranged.

Furthermore, "on the substrate" means not merely "on an element substrate", but also "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

<Outline of Printing Apparatus (FIGS. 1A to 2)>

Figure 1B:
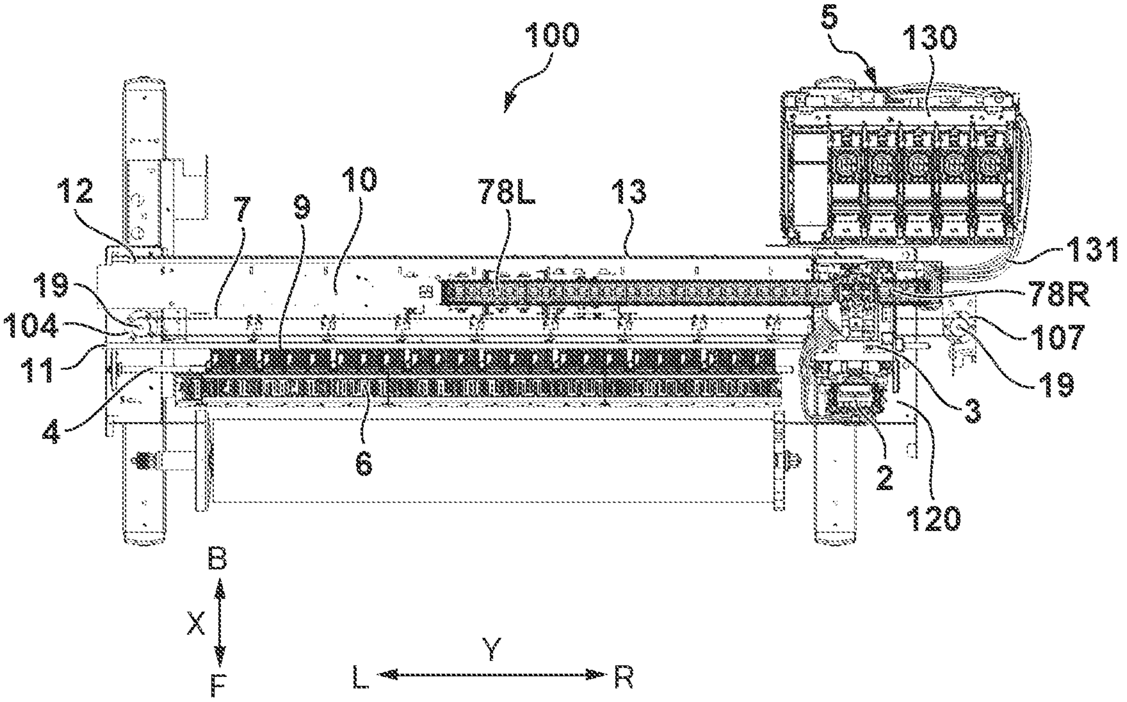

Each of FIGS. 1A and 1B are an outer appearance view showing the schematic arrangement of an inkjet printing apparatus according to a representative embodiment of the present invention. FIG. 1A indicates a perspective view showing the schematic arrangement of an inkjet printing apparatus 100 (to be referred to as a printing apparatus hereinafter), and FIG. 1B indicates a top view thereof.

Figure 2:
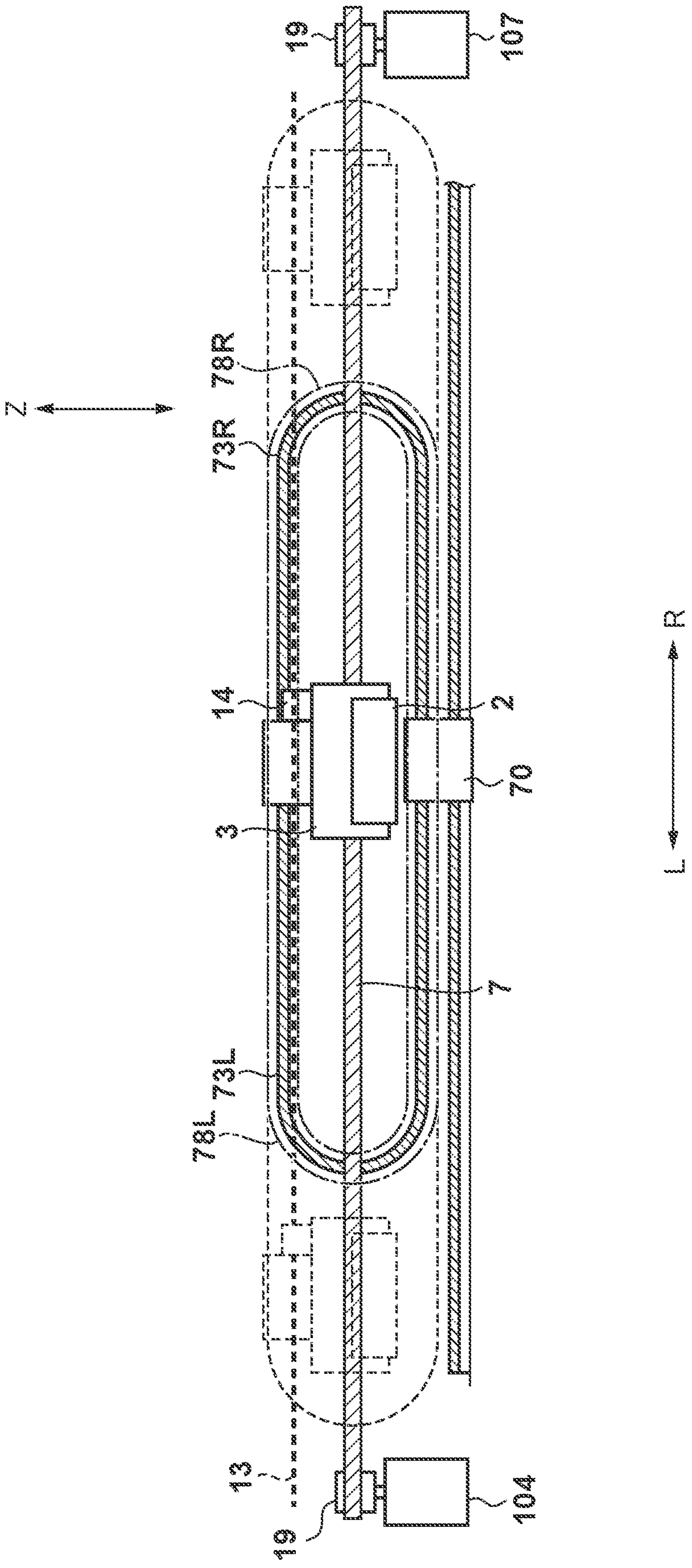
FIG. 2 is an explanatory view showing a structure of a periphery of a carriage of the printing apparatus of FIGS. 1A and 1B.

In addition, FIG. 2 is an explanatory view showing the structure of the periphery of a carriage of the printing apparatus.

In FIGS. 1A to 2, arrows X, Y, and Z indicate the front-and-rear direction (a depth direction), the left-and-right direction (widthwise direction as the longitudinal direction of the apparatus), and the upper-and-lower direction (the vertical direction or the direction of gravity), respectively. In addition, "F", "B", "L", and "R" indicate the front side, the rear side, the left side, and the right side, respectively.

The printing apparatus 100 includes a printing unit including a printhead 2 and a carriage 3. A plurality of discharge orifices (nozzles) are formed on the printhead 2, and a plurality of channels are formed in the printhead 2 so as to communicate with the respective discharge orifices. An inkjet-method energy generating element such as a heater, a piezoelectric element, or the like is arranged in each of the plurality of channels, and ink droplets are discharged from the corresponding discharge orifice by the inkjet method. Ink tanks 5 containing inks to be supplied to the printhead 2 are arranged in positions separate from the printing unit. Note that the printing method is not limited to the inkjet method, and a printhead of another printing method may also be used.

A carriage motor 104 and a carriage motor 107 each connected to a driving pulley 19 are arranged at both ends of a range of movement of the carriage 3. As shown in FIG. 2, both of the rotation shaft of the carriage motor 104 and the rotation shaft of the carriage motor 107 are oriented to the Z direction, that is, the direction of gravity.

A description will be made here by assuming that the carriage motor 104 and the carriage motor 107 arranged at both ends have similar characteristics including the driving pulleys 19. A carriage belt 7 is arranged so as to be suspended between the two carriage motors, and the carriage 3 is attached to a part of the carriage belt 7. The carriage belt 7 is looped over the two carriage motors in the embodiment. The carriage 3 can be made to scan by these components. By using two carriage motors to drive the carriage 3 in this manner, it will be possible to increase the output more than when a carriage is driven by a single carriage motor, and even a heavyweight carriage will be able to be scanned at a high speed.

The printing apparatus 100 also includes a position detection mechanism for detecting the position of the carriage 3. Such a position detection mechanism includes a linear scale 13 extending in a carriage scanning direction and an encoder sensor 14 which is mounted on the carriage 3 and reads slits provided in the linear scale 13. The position control/speed control of the carriage 3 can be performed by feeding back an encoder signal detected by this position detection mechanism.

The carriage 3 on which the printhead 2 is mounted is guided by a guide rail 11 and a guide rail 12 and is supported by a main body of the printing apparatus 100. The guide rail 11 and the guide rail 12 are supported by a main body frame 10. The carriage 3 reciprocally moves along an extending direction of the guide rail 11 and the guide rail 12. A direction in which the carriage 3 is scanned toward the L side and a direction in which the carriage 3 is scanned toward the R side in FIGS. 1A to 2 will be described as "a forward direction" and "a reverse direction", respectively, hereinafter. In addition, regardless of the forward direction and the reverse direction, a direction in which the carriage 3 moves will be referred to as a main scanning direction.

A rolled sheet 1 as a print medium is set in a sheet feeding unit. The printing apparatus 100 includes a conveyance roller 4 which is rotationally driven and a pinch roller 9 which rotates by being driven by the conveyance roller 4. A platen 6 supports the sheet 1 in a position facing the printing unit. The sheet 1 is conveyed in a state in which the sheet 1 is sandwiched between the conveyance roller 4 and the pinch roller 9. A printing operation of discharging ink toward the sheet 1 on the platen 6 while the carriage 3 on which the printhead 2 is mounted is moved in the main scanning direction, and a conveying operation of conveying the sheet 1 in a sheet conveyance direction (sub-scanning direction) stepwise are performed. An image is printed on a sheet in accordance with a serial printing method by repetitively performing the printing operation and the conveying operation.

Note that the reference of the carriage 3 and the sheet 1 is the side on which the ink tanks 5 are present. That is, the end position of a sheet on the reference side will not change even if the width of the sheet changes.

A recovery unit 120 for performing a recovery process on the printhead 2 is arranged at one end (an end portion in the R direction in FIG. 1) of the range of movement of the carriage 3 of the printing apparatus 100.

The ink tanks 5 for inks such as black (K), cyan (C), magenta (M), yellow (Y), and the like can be detachably attached to an ink supplying unit 130 fixed to the main body of the printing apparatus 100. Supply tubes (ink supply channels) 131 are connected to the ink supplying unit 130, and supply inks to the printhead 2 by connecting to a tube 73R and a tube 73L.

Each of the tube 73R and the tube 73L is a tube formed by a plurality of flexible ink tubes for supplying inks of a plurality of colors from the ink tanks 5 fixed to the side of the main body of the printing apparatus 100 to the printhead 2 on the carriage 3. The tube 73R is provided so that its R side will be U-shaped in the Y direction by fixing its one end to the carriage 3 and its other end to a connecting member 70 which is fixed to the side of the main body of the printing apparatus 100. In a similar manner, the tube 73L is also provided so that its L side will be U-shaped in the Y direction. In this example, the tube 73R and the tube 73L are installed to have the same number of bundled tubes, the same length, the same material, and the like as each other, and have only different curving directions from each other.

In addition, to guide the deformation of the tube 73R and the tube 73L which accompanies the reciprocal movement of the carriage 3, the printing apparatus 100 includes tube holding members 78R and 78L. In this example, each tube holding member is a chain link (cable carrier) formed by connecting a plurality of link members. Each link member is a ring-shaped member in which a tube can be inserted, and adjacent link members are pivotably connected to each other about an axis in the X direction. Each of the tube holding members 78R and 78L is curved in a U shape in the Y direction and deforms by changing a curving portion so as to follow the reciprocal movement of the carriage 3. In this example, the tube holding members 78R and 78L have the same number of connected link members. The tube 73R is inserted in the tube holding member 78R, and the tube 73L is inserted in the tube holding member 78L.

Several embodiments of an arrangement for applying tension to the carriage belt 7 in the printing apparatus 100 having the above-described arrangement will be described next.

Figure 3:
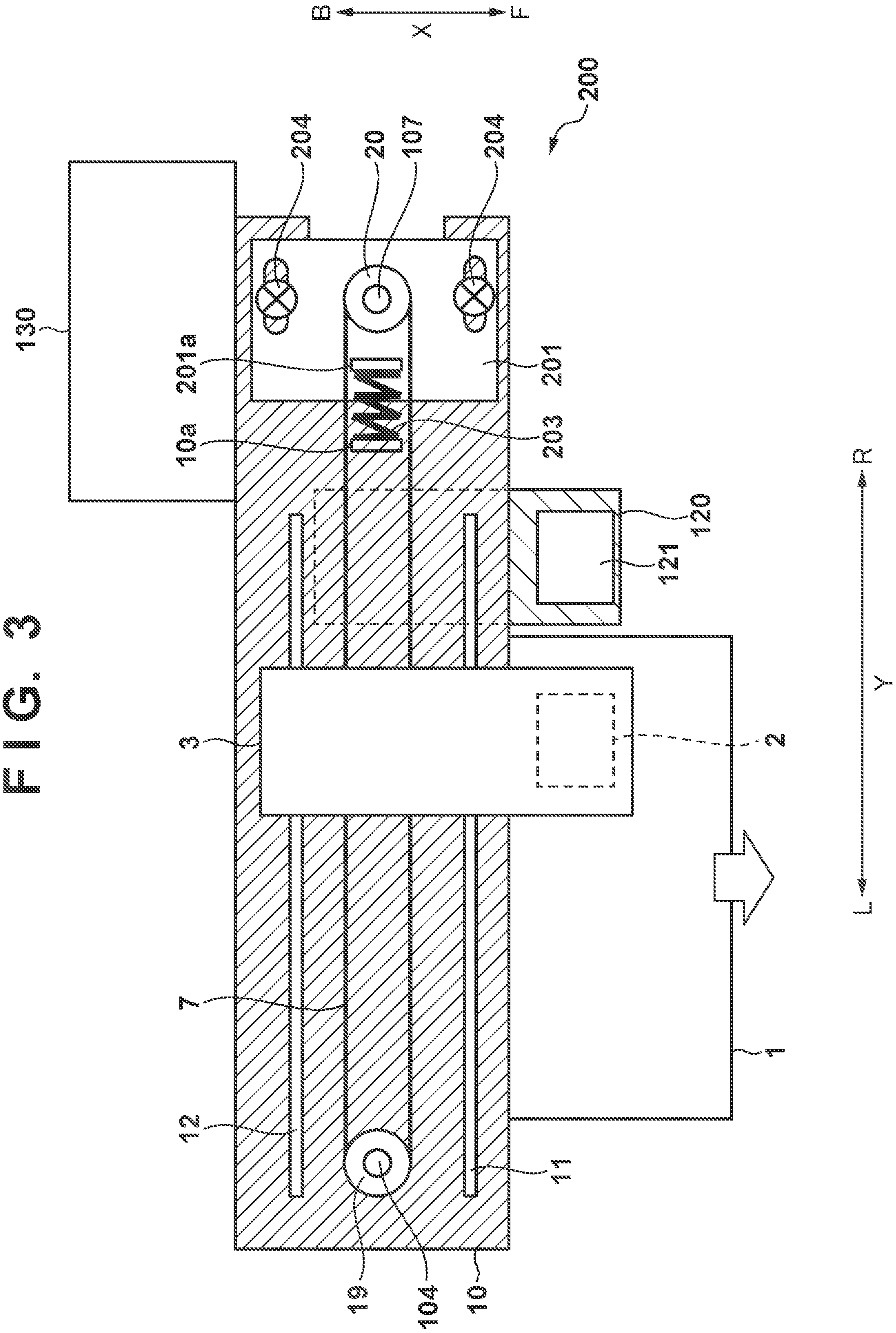
FIG. 3 is a top view showing an arrangement for applying tension to a carriage belt in the printing apparatus shown in FIGS. 1A to 2.
Figure 4:
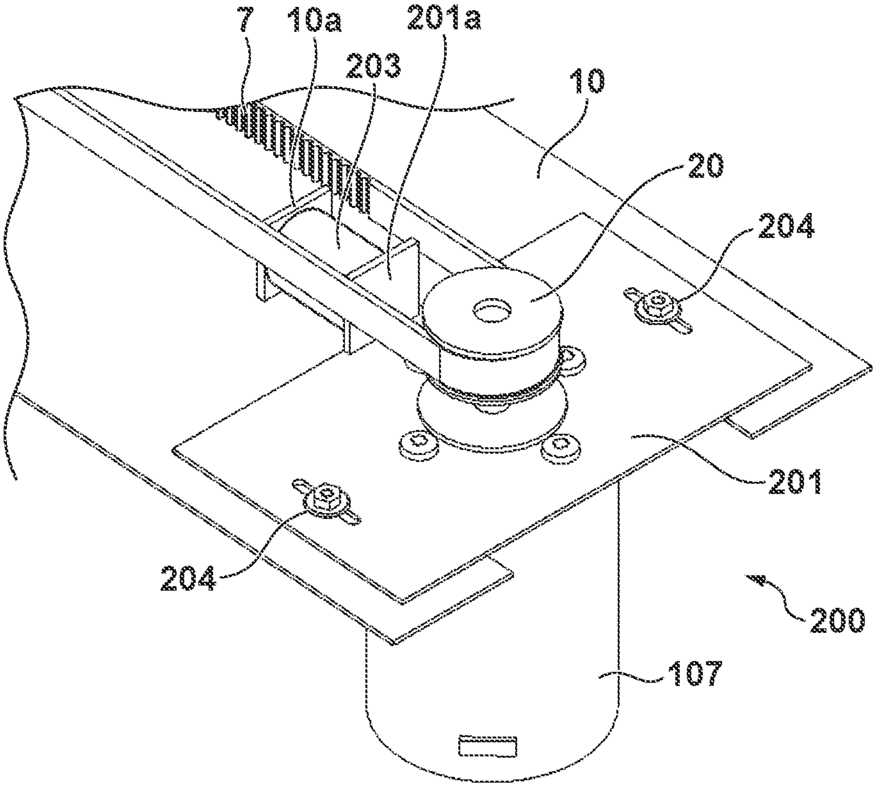
FIG. 4 is a perspective view showing an arrangement of a tension applying unit according to the first embodiment.

First Embodiment (FIGS. 3 and 4)

FIG. 3 is a top view showing an arrangement for applying tension to the carriage belt in the printing apparatus shown in FIGS. 1A to 2, and FIG. 4 is a perspective view showing the arrangement of a tension applying unit 200. Note that in FIGS. 3 and 4, the same reference numerals denote components which are similar to those already described with reference to FIGS. 1A to 2, and a description thereof will be omitted.

One carriage motor 104 is fixed to a main body frame 10 as shown in FIG. 3, and the other carriage motor 107 is fixed to a motor support member 201 as shown in FIGS. 3 and 4. A spring receiving portion 201*a* as a plane (a plane which includes an axis approximately perpendicular to the X-axis and the Y-axis) approximately perpendicular to a surface for fixing the carriage motor 107 is arranged on the motor support member 201. In addition, the motor support member 201 can make the carriage motor 107 displace, with respect to the main body frame 10, in an approximately Y direction, that is, in a direction to apply tension to a carriage belt 7, and can be fixed to the main body frame 10 by screws 204 in a state in which tension is applied to the carriage belt 7.

A spring receiving portion 10*a* which faces the spring receiving portion 201*a* of the motor support member 201 is arranged in the main body frame 10. A spring 203 is arranged between the spring receiving portion 201*a* and the spring receiving portion 10*a*, and the motor support member 201 is displaced by a restoring force of the spring. This will allow tension to be applied to the carriage belt 7 by using the elasticity of the spring 203. At this time, the carriage motor 107 is arranged to be positioned below the motor support member 201 (on a side opposite to a driving pulley 20). As a result, the carriage motor 107 will have a low center of gravity, the weight of the carriage motor 107 will stabilize the posture of the motor support member 201, and the restoring force of the spring can be efficiently converted into tension.

Also, as is obvious from FIGS. 3 and 4, the spring receiving portion 201*a* and the spring receiving portion 10*a* will be arranged immediately below the carriage belt 7.

Note that although the spring 203 is assumed to be a compression spring here, a tension spring may be used by arranging a pair of hook shapes that face each other in the motor support member 201 and the main body frame 10, and the tension of this tension spring may be used to move the motor support member 201. Alternatively, a plurality of spring receiving portions may be arranged, and a plurality of springs may be used to move the motor support member 201.

A cap 121 that covers an ink discharge surface of a printhead 2 is also arranged in a recovery unit 120. The cap 121 is indicated by a dotted line in FIG. 3.

The application of tension to the carriage belt 7 is performed in accordance with the following steps.

Step 1

First, in a state in which the carriage belt 7 is not suspended over each of a driving pulley 19 and the driving pulley 20, which are attached to the rotation shafts of the carriage motors 104 and 107, respectively, a force is applied to the motor support member 201 in an approximately forward direction (a direction in which a carriage 3 is moved in the L direction).

Step 2

Next, by displacing the motor support member 201 in the approximately forward direction while compressing the spring 203, the distance between the shafts of the driving pulleys 19 and 20 is shortened, and the carriage belt 7 is suspended by being moved over the flange portions of the driving pulleys 19 and 20.

Step 3

Subsequently, the compression force of the spring 203 is released to displace the motor support member 201 in the reverse direction (a direction in which the carriage 3 is moved in the R direction) by the restoring force of the spring 203, thereby applying tension to the carriage belt 7.

Step 4

Finally, the motor support member 201 is fixed to the main body frame 10 by the screws 204.

By suitably designing the spacing between the spring receiving portions, the restoring force and the working length of the spring 203, and the location to be fixed by the screws 204, appropriate tension can be applied to and maintained on the carriage belt 7.

In this embodiment, the restoring force of the spring 203 is designed so an error which is 30% or more than the tension of the carriage belt 7 recommended by a specification manual will not be generated when the tolerances of respective components are included. It has been empirically proven that no failure will occur within this range.

Hence, according to the above-described embodiment, in arrangement in which a plurality of driving motors for increasing the driving force of a carriage are arranged so as to drive pulleys arranged on both sides, it will be possible to apply and maintain desired tension without requiring complicated adjustment.

Figure 5:
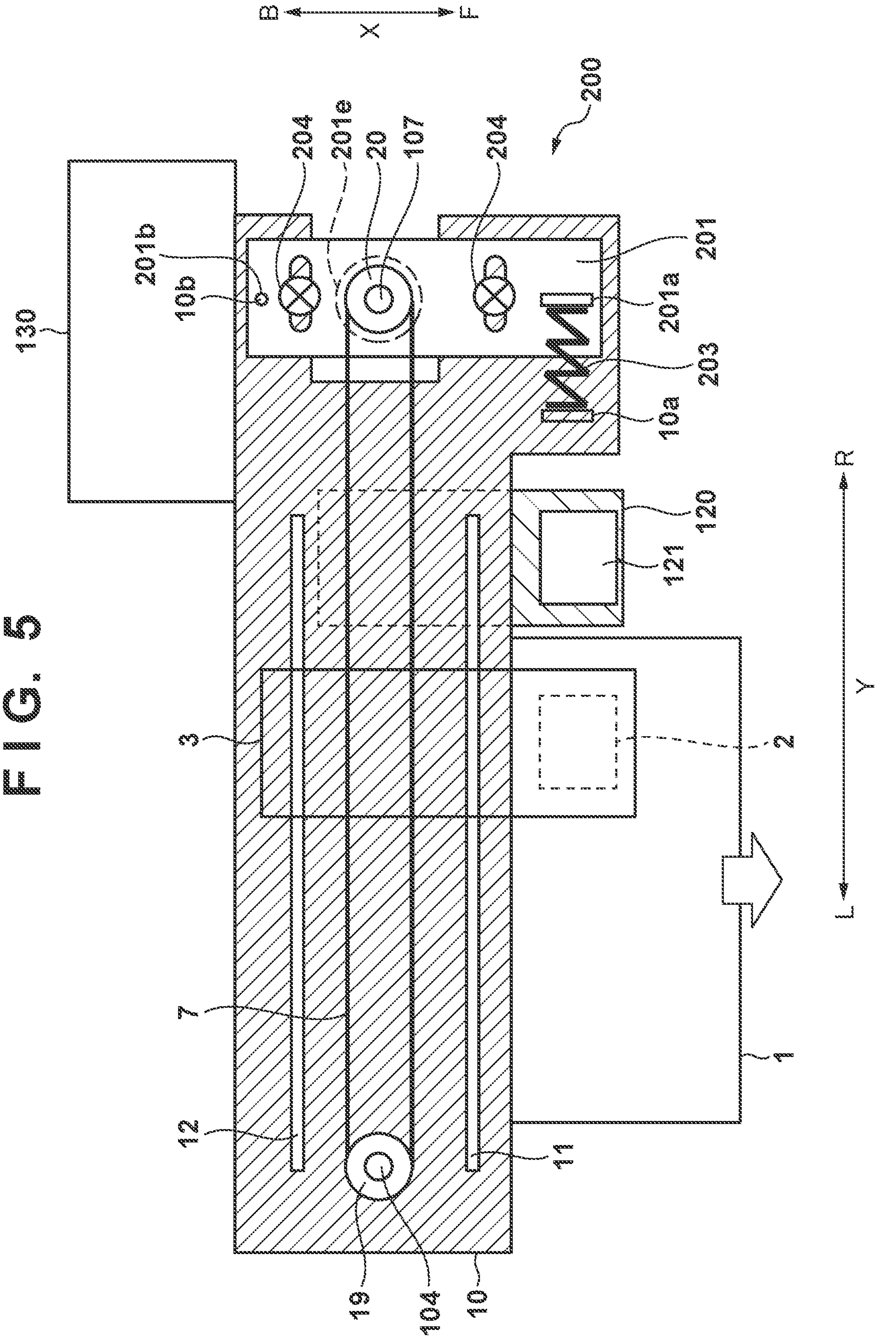
FIG. 5 is a top view showing an arrangement for applying tension to a carriage belt in a printing apparatus shown in FIGS. 1A to 2.
Figure 6:
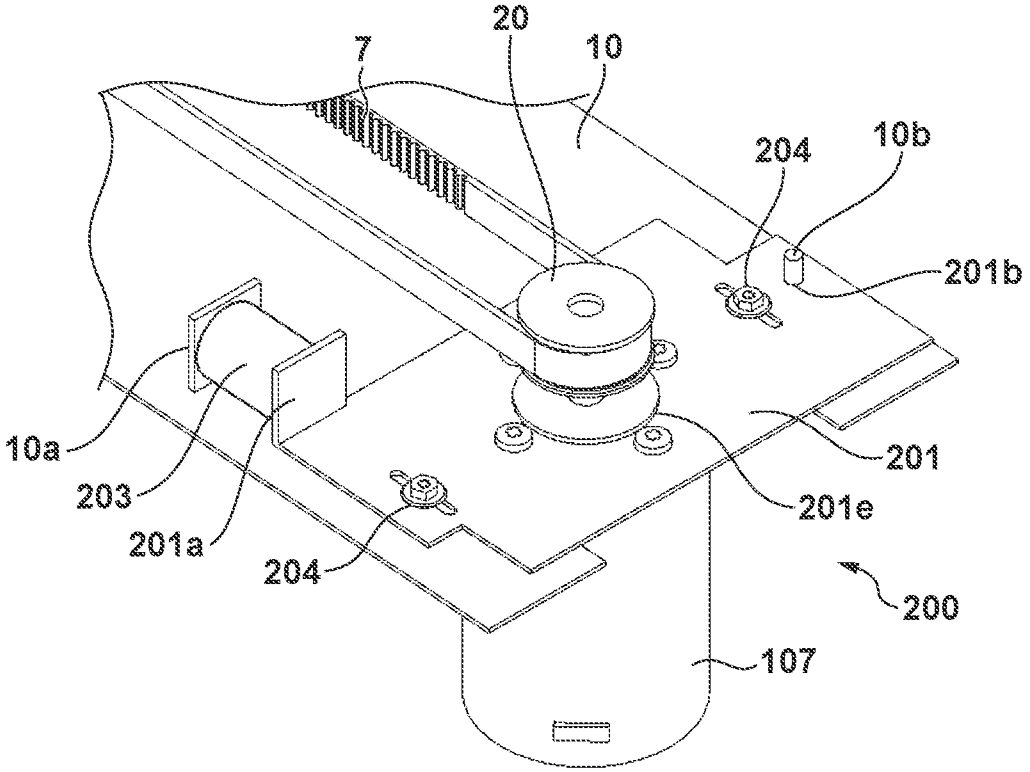
FIG. 6 is a perspective view showing an arrangement of a tension applying unit according to the second embodiment.

Second Embodiment (FIGS. 5 and 6)

An example for further improving the assemblability of a spring and the tension control of a belt will be described here.

FIG. 5 is a top view showing an arrangement for applying tension to the carriage belt in the printing apparatus shown in FIGS. 1A to 2, and FIG. 6 is perspective view showing the arrangement of a tension applying unit 200. Note that in FIGS. 5 and 6, the same reference numerals denote components which are similar to those already described with reference to FIGS. 1A to 2, and a description thereof will be omitted.

As shown in FIG. 5, a motor support member 201 is arranged to be pivotable by arranging a pivot center 201*b* in a direction approximately perpendicular to a tension application direction of a carriage belt 7 from a motor support portion 201*e* of a carriage motor 107, and engaging with a protruding shape 10*b* arranged on a main body frame 10. The motor support member 201 also includes a spring receiving portion 201*a* in a direction approximately perpendicular to the tension application direction of the carriage belt 7. On the other hand, a spring receiving portion 10*a* is also arranged in the main body frame 10 so as to face the spring receiving portion 201*a*.

Subsequently, by arranging a spring 203 between the spring receiving portion 201*a* and the spring receiving portion 10*a*, the motor support member 201 is pressed to the R side in the Y direction by the elastic force of the spring 203. In a similar manner, the motor support portion 201*e* will also be pressed to the R side in the Y direction. Since a driving pulley 20 arranged on the carriage motor 107 will also be pressed to the R side as a result, tension can be generated on the carriage belt 7.

In this manner, the driving pulley 20 will be pressed by arranging the motor support member 201 to be pivotable, and the pivot center 201*b* and the spring receiving portion 201*a* at this time will be arranged in a direction approximately perpendicular to the tension application direction of the carriage belt 7.

Therefore, according to the above-described embodiment, tension can be applied to the carriage belt 7 without increasing the width of the printing apparatus. In addition, it will be possible to simultaneously make the spring 203 be spaced apart from the driving pulley 20 and the carriage belt 7, thus ensuring a work space. As a result, it will facilitate the attachment/detachment of the spring 203. Furthermore, since the distance from the pivot center 201*b* to the spring receiving portion 201*a* is set longer than the distance from the pivot center 201*b* to the driving pulley 20, the principle of the lever will act. This will allow the load value of the spring 203 to be set low, thereby improving the workability. Also, since a large installation space can be ensured for the spring 203, a spring constant can be set low by increasing the number of coils or the diameter of the spring or the like, allowing the degree of freedom of the design to be increased advantageously.

The motor support member 201 is fixed to a swinging position by screws 204 in accordance with each individual member. At this time, together with the driving pulley 20, the carriage belt 7 will also be slightly displaced in the X direction. However, a carriage 3 will not be displaced in the X direction since it is installed to be slidable on a guide rail 11 and a guide rail 12.

In addition, although the above-described example showed an arrangement that uses a compression spring, it may be arranged so that belt tension will be generated by arranging a tension spring on a side in the reverse direction of the example shown in FIGS. 5 and 6.

Furthermore, although the pivot center 201*b* and the spring receiving portion 201*a* were arranged at both ends with the motor support portion 201*e* sandwiched between them in the above-described example, a similar effect can also be obtained by arranging the motor support portion 201*e* and the spring receiving portion at both ends with the pivot center sandwiched between them.

Figure 7:
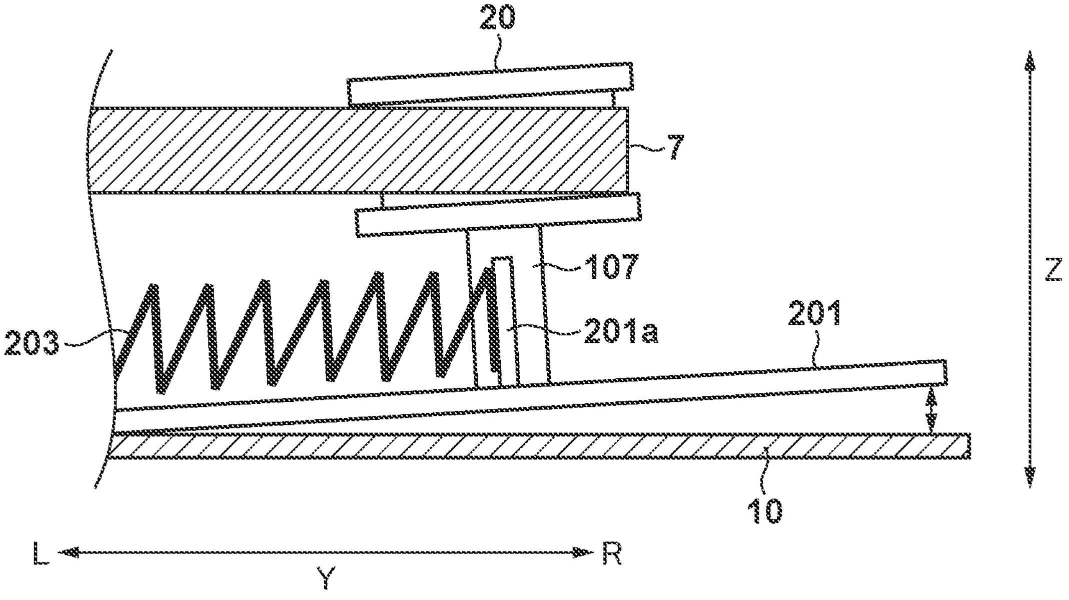
FIG. 7 is a sectional view showing the state of a tension applying unit in a case in which a driving pulley is set higher than spring receiving portions.
Figure 8:
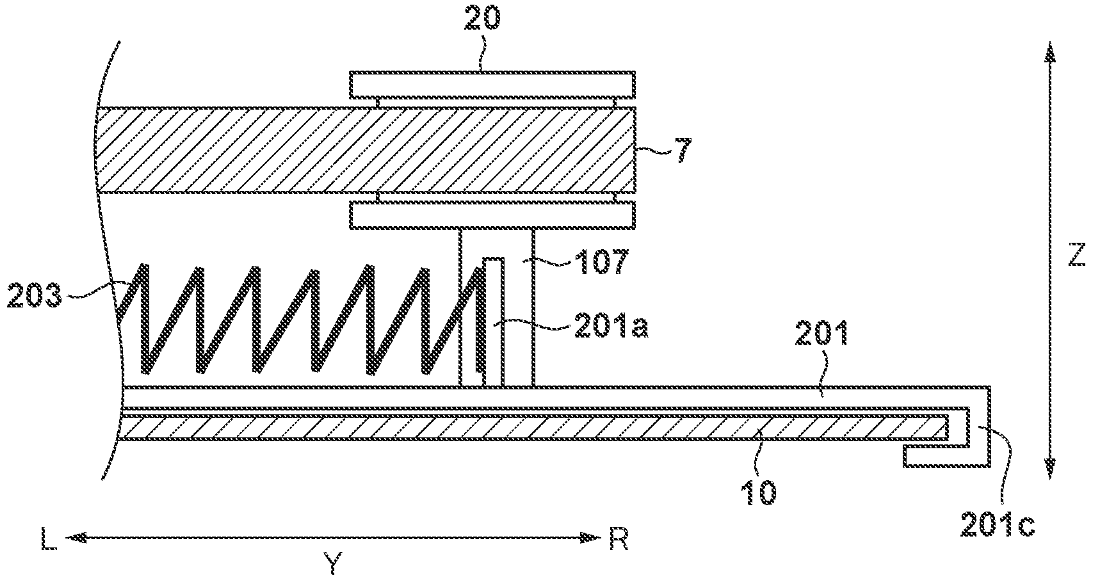
FIG. 8 is a sectional view showing the state of the tension applying unit, according to the third embodiment, which is capable of applying appropriate tension even in a case in which the driving pulley is set higher than the spring receiving portions.
Figure 9:
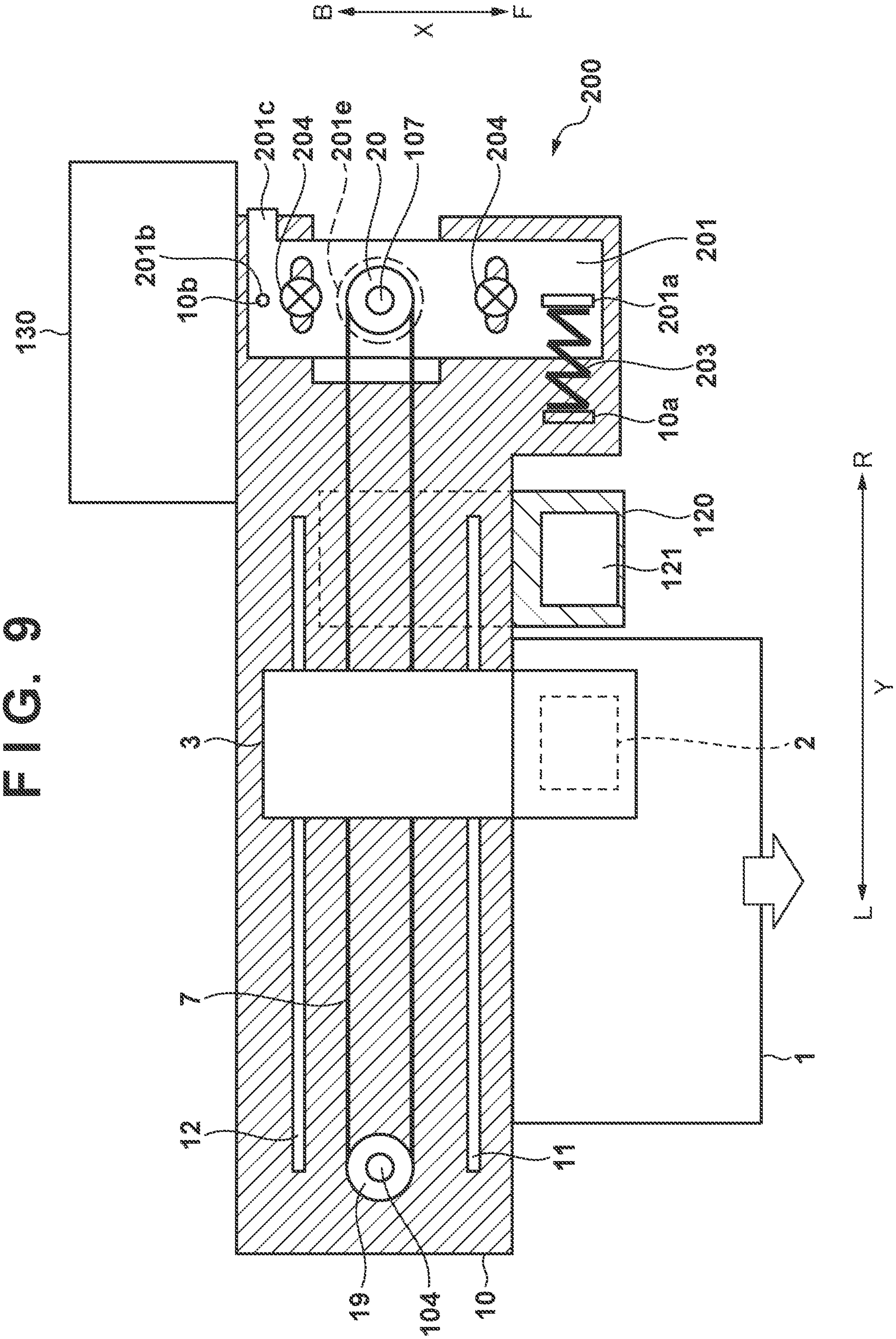
FIG. 9 is a top view showing an arrangement for applying tension to a carriage belt in a printing apparatus shown in FIGS. 1A to 2.

Third Embodiment (FIGS. 7 to 9)

In the first and second embodiments, spring receiving portions 10*a* and 201*a* and a driving pulley 20 were arranged at similar heights (positions) in the Z direction shown in FIG. 1. However, the following problem will occur if the driving pulley 20 is arranged higher than the spring receiving portions 10*a* and 201*a*.

FIG. 7 is a sectional view showing the state of a tension applying unit in a case in which the driving pulley 20 is arranged higher than the spring receiving portions 10*a* and 201*a*.

In such a case, as shown in FIG. 7, a motor support member 201 will be pulled by a carriage belt 7 and lift up from a main body frame 10 in the Z direction. If the motor support member 201 is fixed in a state in which it is lifted from the main body frame 10, the tension to be applied to the carriage belt 7 may not reach a predetermined tension value.

This embodiment will describe an arrangement for applying appropriate tension to the carriage belt 7 even in a case in which the driving pulley 20 is arranged in a position higher than the spring receiving portions 10*a* and 201*a* in the Z direction.

FIG. 8 is a sectional view showing the state of a tension applying unit that can apply appropriate tension even in a case in which the driving pulley 20 is arranged higher than the spring receiving portions 10*a* and 201*a*. In addition, FIG. 9 is a top view showing an arrangement for applying tension to the carriage belt in the printing apparatus shown in FIGS. 1 and 2. Note that in FIGS. 7 to 9, the same reference numerals denote components which are similar to those already described with reference to FIGS. 1 and 2, and a description thereof will be omitted.

In this embodiment, the motor support member 201 will have a hook shape 201*c* on a side closer to the R side in the Y direction than the driving pulley 20, and be hooked to the reverse surface side of the main body frame 10.

Therefore, according to the above-described embodiment, arranging a hook shape in the motor support member will allow the hook shape of the motor support member to be hooked to the main body frame. This will prevent the motor support member from lifting, and will allow appropriate belt tension to be applied to a carriage belt when the motor support member is to be fixed. As a result, the motor support member can be prevented from lifting when the belt tension is applied to the motor support member, and appropriate belt tension can be set to the carriage belt.

Furthermore, by arranging the motor support member to be pivotable and to be spaced apart from the carriage belt and the carriage motor, the assembly of the spring will be simplified, thus improving assemblability.

Note that although the hook shape 201*c* was arranged in the motor support member 201, it may be arranged so that a hook shape will be formed on the main body frame 10 and be hooked to the obverse surface side of the motor support member 201.

Figure 10:
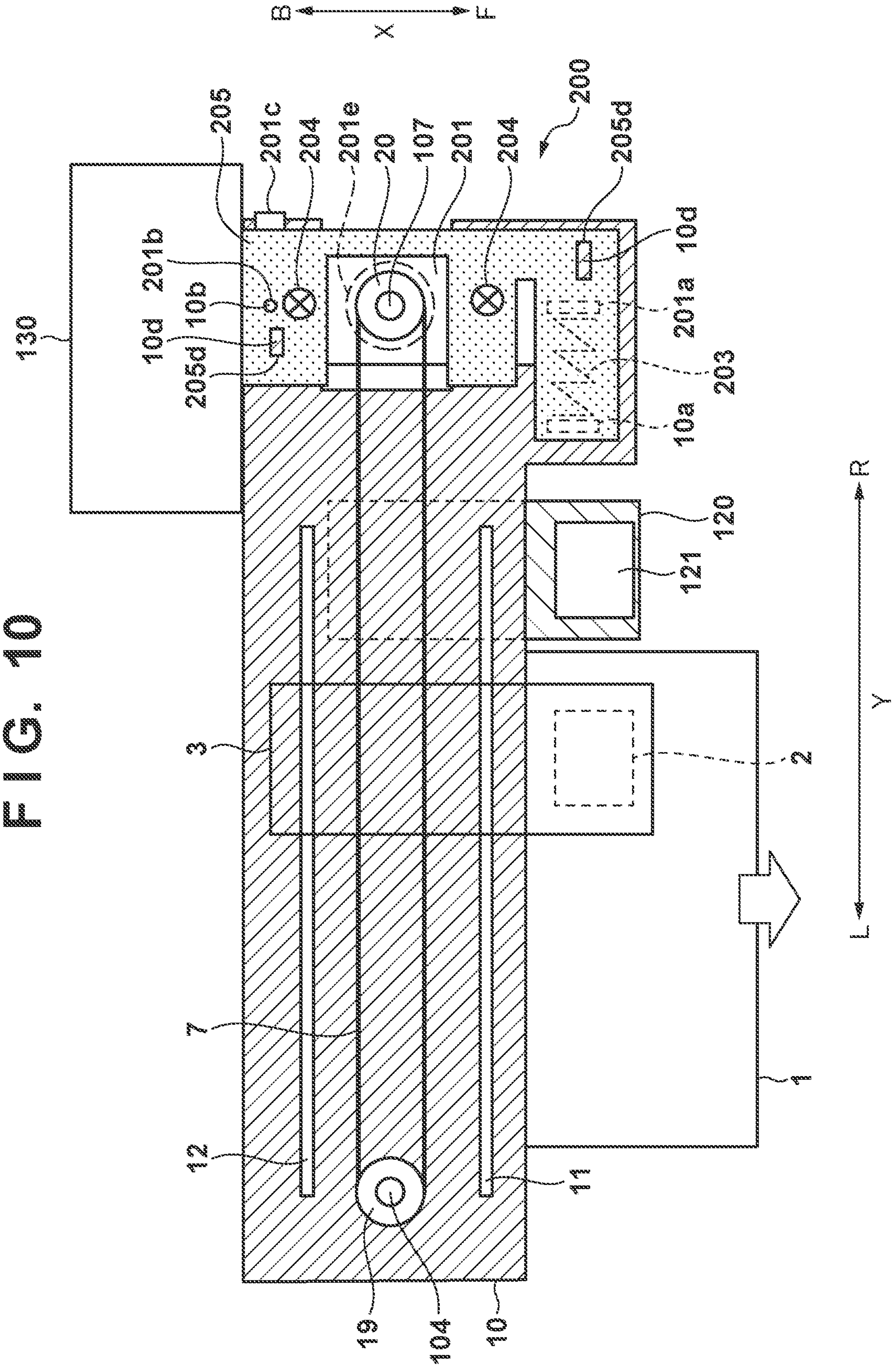
FIG. 10 is a top view showing an arrangement for applying tension to a carriage belt in a printing apparatus shown in FIGS. 1A to 2.
Figure 11:
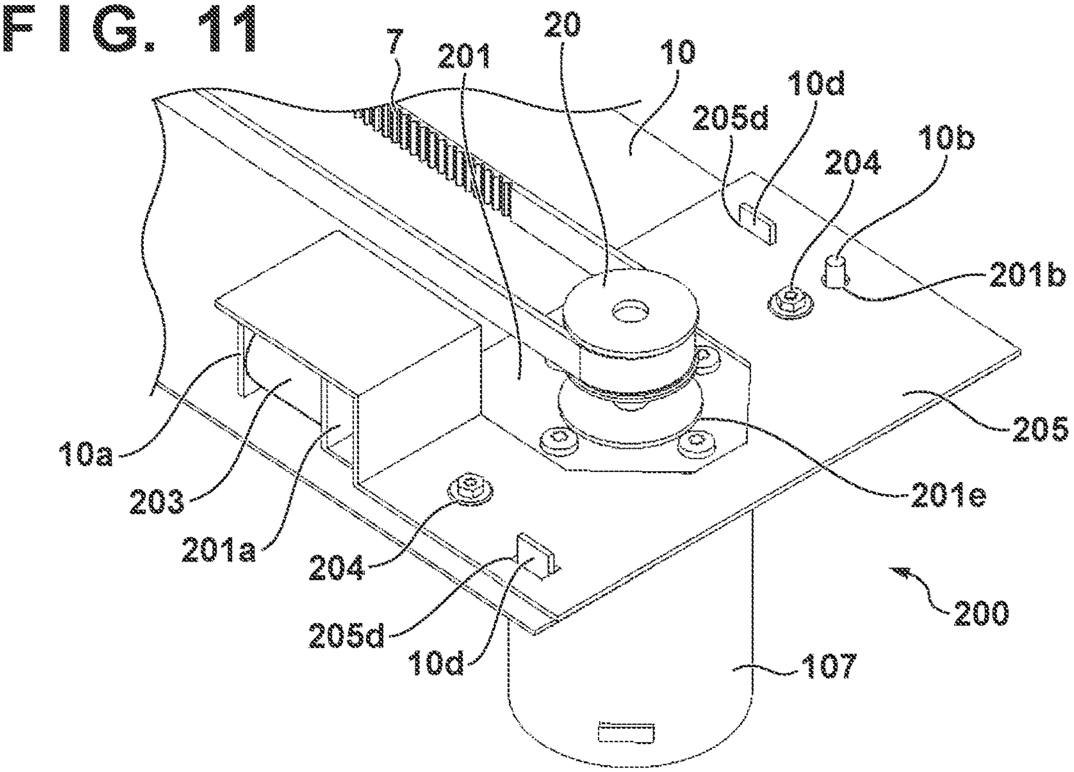
FIG. 11 is a perspective view showing an arrangement of a tension applying unit according to the fourth embodiment.

Fourth Embodiment (FIGS. 10 and 11)

After the belt tension of a carriage belt 7 has been set appropriately, a motor support member 201 will be fastened to a main body frame 10 by screws 204. At this time, if an operator unintentionally touches the motor support member 201, the motor support member may be moved slightly away from a position where predetermined belt tension is being generated by a spring 203, and may be fixed to a position with inappropriate belt tension.

In addition, in a case in which the motor support member 201 is to be fastened to the main body frame 10 from below by the screws 204, a rotational force will be generated in the motor support member 201 in the CW (clockwise) direction in a manner similar to the screw rotation direction when viewed from the fastening direction. As a result, the motor support member 201 will be moved slightly in a manner similar to that describe above, and the motor support member 201 will be fixed to a position with inappropriate belt tension.

In order to solve the above-described problems, an example that will allow more desirable tension control will be described here.

FIG. 10 is a top view showing an arrangement for applying tension to the carriage belt of the printing apparatus shown in FIGS. 1A to 2, and FIG. 11 is a perspective view showing an arrangement of a tension applying unit 200. Note that in FIGS. 10 and 11, the same reference numerals denote components which are similar to those already described with reference to FIGS. 1 and 2, and a description thereof will be omitted.

In this embodiment, as shown in FIGS. 10 and 11, excluding some parts such as a motor support portion 201*e* and the like, a cover member 205 covers a pivot center 201*b*, a spring receiving portion 201*a*, the spring 203, and a spring receiving portion 202*a*. That is, the contact surface of each screw 204 is the cover member 205, and the cover member 205 and the motor support member 201 will be fastened together to the main body frame 10 below. Note that the cover member 205 is shown as a dotted region in FIG. 10.

In addition, the cover member 205 is restricted in the rotation direction by a protruding shape 10*d* formed in the main body frame 10 and a corresponding hole shape 205*d* provided in the cover member 205. This will make it difficult for the operator to touch the motor support member 201. In addition, since rotation will be restricted even if the operator touches the cover member 205, the motor support member 201 will not be influenced, and the belt tension of the carriage belt 7 will be maintained appropriately.

Furthermore, since the rotation of the cover member 205 as the contact surface will be restricted even if a rotational force is generated in the CW (clockwise) direction by the fastening of each screw 204, the motor support member 201 will not be influenced, and the belt tension of the carriage belt 7 will be maintained correctly.

Therefore, according to the above-described embodiment, by arranging the cover member so as to cover the motor support member, the motor support member can be prevented from moving unintentionally during screw fastening, and appropriate belt tension can be set to the carriage belt.

Figure 12:
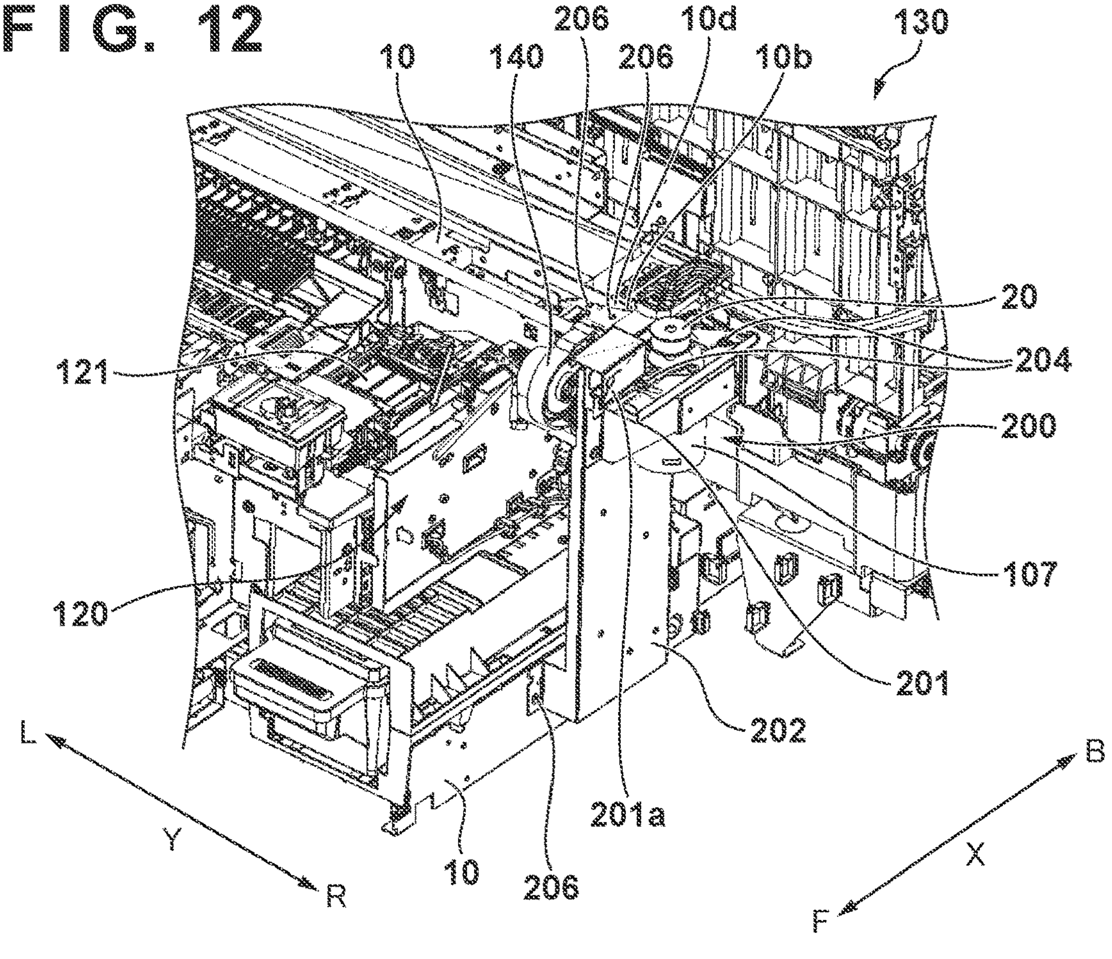
FIG. 12 is a perspective view showing a structure near a recovery unit of a printing apparatus shown in FIGS. 1A and 1B, and is a view showing a state in which the recovery unit is attached to the printing apparatus.
Figure 13:
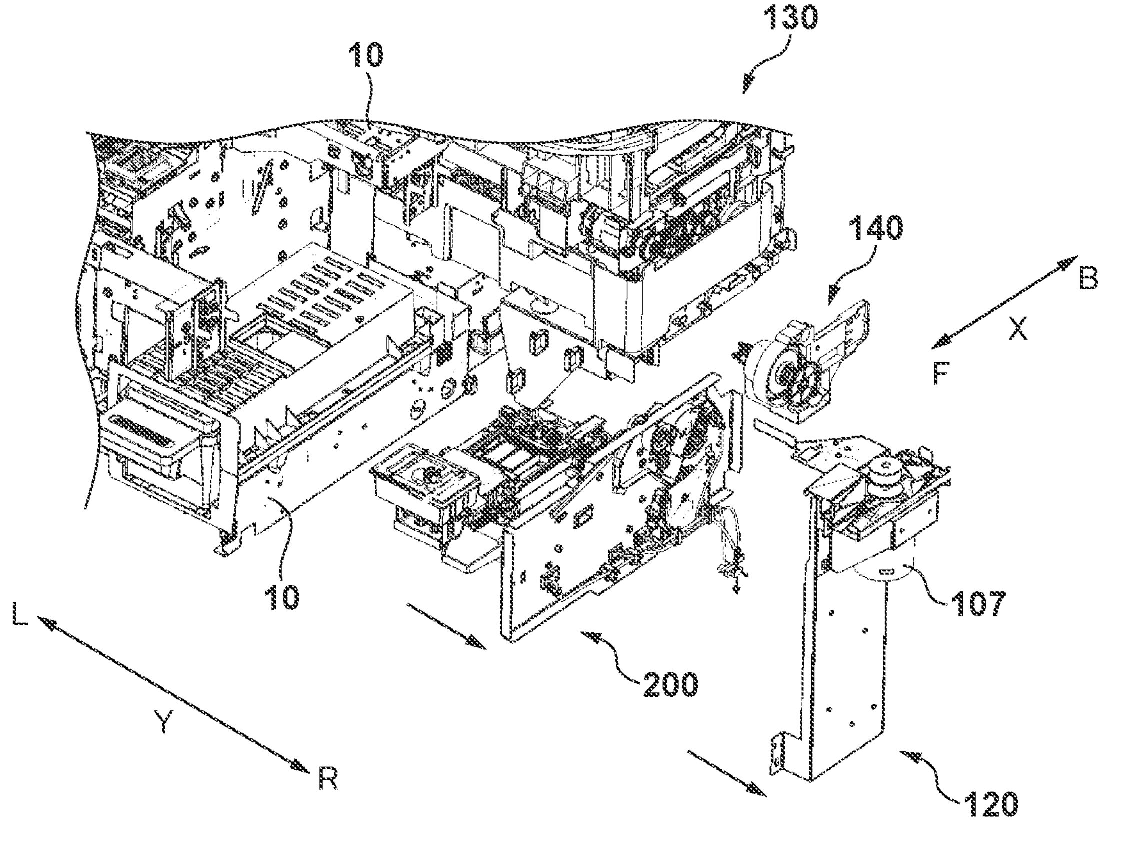
FIG. 13 is a perspective view showing the structure near the recovery unit of the printing apparatus shown in FIGS. 1A and 1B, and is a view showing a state in which the recovery unit has been removed from the printing apparatus.

<Fifth Embodiment (FIGS. 12 and 13)

An operation performed when a service person repairs or performs maintenance on a recovery unit 120 or an ink supplying unit 130 will be described.

Repair and Maintenance of Recovery Unit

FIGS. 12 and 13 each are a perspective view showing a structure near the recovery unit 120 of a printing apparatus 100 shown in FIG. 1. FIG. 12 shows a state in which the recovery unit 120 is attached to the printing apparatus 100, and FIG. 13 shows a state in which the recovery unit 120 is detached from the printing apparatus 100.

A cap 121 for sealing the surfaces of the discharge orifices formed on a printhead 2 is provided on the recovery unit 120 as described above. An in-cap absorbing member is provided in the cap 121 to receive and absorb ink discharged during a preliminary ink discharge operation (preliminary discharge) performed to prevent discharge failure of the printhead 2.

The cap 121 is connected to a suction pump via a tube and sucks ink or air from the surfaces of the discharge orifices of the printhead 2, as needed, to clean the discharge orifices and to remove air accumulated in the printhead. A wiper member is also provided to remove ink or dirt that has adhered to the surfaces of the discharge orifices of the printhead 2. In addition, a discharge failure detection unit is arranged beside the recovery unit 120, and the discharge failure detection unit includes a sensor for detecting whether ink is being correctly discharged from each discharge orifice of the printhead 2.

Since the recovery unit 120 will perform a recovery operation on the printhead 2 which is mounted on a carriage 3, the recovery unit 120 will be arranged outside the width of a sheet 1 but also be arranged inside the range of scanning of the carriage 3. As shown in FIG. 12, a carriage motor 107 including a driving pulley 20, a spring 203, and a motor support member 201 are attached to a motor attachment plate 202, and are formed to be integrally attachable/detachable as a tension applying unit 200. In addition, the tension applying unit 200 is fixed to a main body frame 10 by screws 206.

In the first to fourth embodiments, the motor support member 201 was fixed to the main body frame 10 by screws. In contrast, in this embodiment, the motor support member 201 is fixed to the motor attachment plate 202 by screws. In this case, since the motor attachment plate 202 and the main body frame 10 are accurately positioned by embossing, their attachment variation will be sufficiently small at several 10μ (microns), and the influence of the tension applied to the carriage belt 7 by the spring 203 will be minor and unproblematic.

In addition, in the second and fourth embodiments, a spring receiving portion 10*a*, a protruding shape 10*b*, and a protruding shape 10*d* were provided in the main body frame 10. However, in this embodiment, these components are provided in the motor attachment plate 202. In addition, the tension applying unit 200 includes the carriage motor 107 and is arranged outside the range of scanning of the carriage 3.

Hence, as shown in FIG. 12, the tension applying unit 200 is arranged on the outer side of the recovery unit 120 arranged inside the range of scanning of the carriage 3, and is fixed to the main body frame 10 by the screws 206. Hence, at the time of maintenance or replacement, the recovery unit 120 will be removed after the tension applying unit 200 has been removed.

The service person will repair or perform a replacement operation when the recovery unit 120 has been damaged by an unintended operation or needs regular maintenance.

To perform an operation for maintenance or replacement, an exterior will be removed first, screws 204 of the tension applying unit 200 will be loosened, the tension applied to the carriage belt 7 will be released, and the carriage belt 7 will be removed from the driving pulley 20 of the carriage motor 107. Subsequently, as shown in FIG. 13, the tension applying unit 200 will be detached by removing the screws 206, and the recovery unit 120 will be detached from the main body.

As described above, since the tension applying unit 200 and the recovery unit 120 are arranged on the same side (R side) of the printing apparatus 100 in the Y direction, the service person can complete an operation by removing only the exterior on the R side. Hence, it will be possible to shorten the operation time.

In addition, since the carriage motor 107, the spring 203, and the motor support member 201 are integrally formed in the tension applying unit 200, these components can be detached all together from the main body by removing only the screws 206 fastened to the main body frame 10. Hence, it will be possible to shorten the operation time.

Note that the tension applying unit 200 is not limited to an integral arrangement. It may be also arranged so that the components will be formed as a plurality of sub units and be detached by separating the components in accordance with the plurality of sub units.

In addition, at the time of reassembly after the completion of repairment or maintenance, the aforementioned procedure can be performed in reverse so that the tension applying unit 200 will be attached and fixed to the main body frame 10 by the screws 206 after the recovery unit 120 has been attached to the main body by screws. Subsequently, after suspending the carriage belt 7 onto the driving pulley 20 and applying tension by the spring 203, the motor support member 201 will be fixed by the screws 204, and the exterior will be finally attached to complete the operation.

Repair and Maintenance of Ink Supplying Unit 130

The service person will repair or perform a replacement operation when the ink supplying unit 130 has been damaged by an unintended operation or needs regular maintenance. To perform an operation for maintenance or replacement, the operation for maintenance or replacement of the ink supplying unit 130 will be performed by first removing the exterior.

Hence, as shown in FIG. 12, the ink supplying unit 130 is arranged on the R side in the Y direction, and the tension applying unit 200 and the recovery unit 120 are arranged on the same side in the Y direction. As a result, the service person will be able to complete an operation which includes the ink supplying unit by removing only the exterior on the R side of the printing apparatus 100, and it will be possible to shorten the operation time.

In addition, as shown in FIGS. 12 and 13, to execute a printing operation corresponding to the type of the sheet or the printing quality, a carriage elevating member 140 for changing the distance between the printhead 2 and the sheet 1 is arranged on the R side in the Y direction. Hence, when the carriage elevating member 140 is damaged or requires maintenance, the service person can simply remove the exterior of the printing apparatus 100 on the R side in the Y direction to complete the operation.

Note that although the cap 121, the absorbing member for receiving a preliminary discharge, the suction pump, the wiper member, and the discharge failure detection unit have been described as the recovery unit 120 in the above-described embodiment, it may be arranged so that each of these components can be detached separately. In addition, it may be arranged so that a motor, a gear, and the like which form the carriage elevating member 140 will also be divided and be detached separately.

Furthermore, although the above-described embodiments and their modifications have been described by using the example of a printing apparatus that performs printing by causing a carriage on which a printhead is mounted to reciprocally move, the present invention is not limited to this. For example, the present invention is also applicable to a scanner apparatus that reads an image on an original by causing a scanner on which a contact image scanner (CIS) is mounted to reciprocally move, a multifunction peripheral incorporating both such a scanner apparatus and a printing apparatus, and the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-166110, filed Sep. 30, 2020, which is hereby incorporated by reference herein in its entirety.

What is claimed is:

1. A printing apparatus comprising:

a print head configured to print an image on a sheet;

a carriage, on which the print head is mounted, configured to reciprocally move in a first direction;

a first motor arranged on a side of one end of a range of movement of the carriage and configured to drive the carriage;

a second motor arranged on a side of the other end of the range of movement of the carriage and configured to drive the carriage;

a first pulley configured to be driven by the first motor through a first rotation shaft;

a second pulley configured to be driven by the second motor through a second rotation shaft;

a frame configured to fix the first motor;

a carriage belt suspended between the first pulley and the second pulley, attached with the carriage, and configured to move the carriage in the first direction; and a support member configured to be arranged between the second pulley and the second motor, and to fix the second motor, wherein the second motor is displaceable in the first direction with respect to the first motor before the support member is fixed to the frame.

2. The printing apparatus according to claim 1, wherein the support member is configured to fix the second motor so that the second motor is displaceable in the first direction with respect to the first motor in a state in which the carriage belt is suspended between the first motor and the second motor.

3. The printing apparatus according to claim 1, wherein the rotation shaft of the first motor and the rotation shaft of the second motor are oriented in a direction of gravity.

4. The printing apparatus according to claim 1, further comprising:

a spring whose one end is attached to the frame and the other end is attached to the support member, wherein the support member is movably attached to the frame in the first direction and fixes the second motor, and wherein tension is applied to the carriage belt by elasticity of the spring by using at least one screw to fix the support member to the frame in a state in which the carriage belt is suspended between the first motor and the second motor.

5. The printing apparatus according to claim 4, further comprising:

a first receiving portion arranged on the frame and configured to receive the one end of the spring; and a second receiving portion arranged on the support member and configured to receive the other end of the spring, wherein two screws are used on two sides of a position where the second motor is to be arranged in a second direction which is perpendicular to the first direction.

6. The printing apparatus according to claim 1, wherein the second motor is arranged, on the support member, on a lower side opposite to a side where the second pulley is arranged in a vertical direction perpendicular to the first direction.

7. The printing apparatus according to claim 5, wherein the first receiving portion and the second receiving portion are arranged immediately below the carriage belt.

8. The printing apparatus according to claim 5, wherein a pivot center configured to allow the support member to pivot is arranged, in the support member, in a position spaced apart from the second motor in the second direction, a first protrusion configured to engage with the pivot center is arranged in the frame, the second receiving portion is arranged in a position opposite to the first protrusion and the pivot center in the support member in the second direction with respect to the second motor, and the first receiving portion is arranged, in the frame, in a position that faces the second receiving portion.

9. The printing apparatus according to claim 8, wherein the support member has, at an end portion in the first direction, a hook shape configured to engage with the frame.

10. The printing apparatus according to claim 9, wherein the hook shape is arranged on a side where the pivot center is arranged with respect to the second direction.

11. The printing apparatus according to claim 8, further comprising:

a cover member configured to cover the pivot center, the first receiving portion, the spring, and the second receiving portion.

12. The printing apparatus according to claim 11, wherein the cover member is fastened to the frame together with the support member by at least one of the two screws.

13. The printing apparatus according to claim 12, wherein a hole is provided in the cover member, a second protrusion corresponding to the hole is arranged in the frame, and the second protrusion engages with the hole when the cover member is fastened to the frame together with the support member by at least one of the two screws.

14. The printing apparatus according to claim 13, wherein a tension applying unit is formed by integrally forming the second motor, the spring, and the support member.

15. The printing apparatus according to claim 1, further comprising:

a recovery unit configured to perform a recovery operation of the printhead.

16. The printing apparatus according to claim 1, further comprising:

an ink supplying unit configured to supply ink to the printhead.

17. The printing apparatus according to claim 16, further comprising a recovery unit configured to perform a recovery operation of the printhead, wherein the ink supplying unit is arranged on the same side as the recovery unit with respect to the first direction.

18. The printing apparatus according to claim 15, further comprising:

a tube connected to the printhead; and a tube holding member that moves together with the printhead and is configured to guide the tube.

* * * * *